INVENTORS
DONALD R. BUCHELE
ALOIS KRSEK JR.
MARVIN W. TIEFERMANN

ATTORNEYS

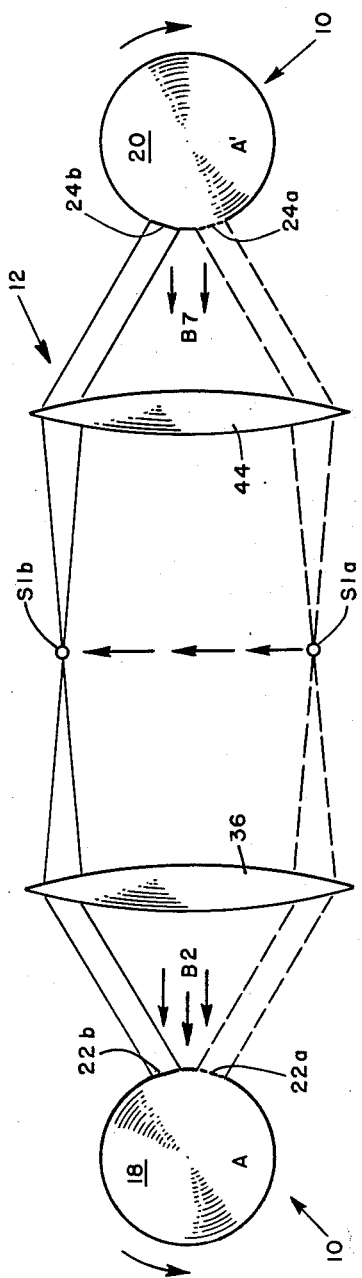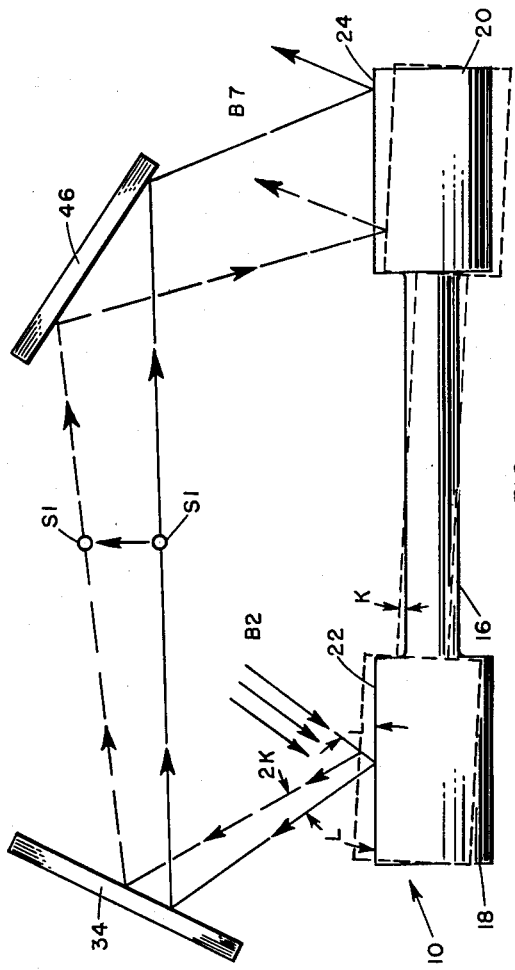

United States Patent Office 3,196,675
Patented July 27, 1965

3,196,675
OPTICAL TORQUEMETER
Donald R. Buchele, Columbia Station, Alois Krsek, Jr., North Olmsted, and Marvin W. Tiefermann, Bay Village, Ohio, assignors to the United States of America as represented by the Administrator of the National Aeronautics and Space Administration
Filed Feb. 28, 1963, Ser. No. 261,912
6 Claims. (Cl. 73—136)
(Granted under Title 35, U.S. Code (1952), sec. 266)

The invention described herein may be manufactured and used by or for the Government of the United States of America for governmental purposes without the payment of any royalties thereon or therefor.

The present invention relates to a torque measuring device and, more particularly, to a remote-reading torquemeter for use where high horsepowers are transmitted at high rotative speeds. The invention is especially useful in measuring the torque on a shaft connecting a turbine to a rocket pump where radial and axial displacement of the shaft is expected.

Various torque measuring systems have been proposed, but each is different in certain research applications where physical contact with the rotating shaft is to be avoided, static calibration is required, and a high degree of accuracy is of paramount importance. For example, it may be necessary to accurately measure certain torques to within one percent of full load at high rotative speeds, such as 50,000 r.p.m., in applications where loads up to 20,000 horsepower are not uncommon. Turbines operating at elevated temperatures around 1600° F. are used to drive cryogenic pumps that contain extremely cold liquid having temperatures as low as −430° F., and radial as well as axial movements of the shafts which couple the turbines to the pumps are encountered.

While strain-gage torquemeters and other types of torque measuring devices utilizing sliprings work satisfactorily at relatively low speeds, noise and rapid wear of the brushes make such devices undesirable where the torque shaft is rotating at high speeds, say above 20,000 r.p.m. Some electrical and magnetic devices are sensitive to axial or radial displacement of the torque shaft which changes the air gap thereby altering their calibration characteristics. Electric dynamometers, which absorb power, are likewise unsuitable for certain phases of research. Other objectionable features of certain devices for measuring torque are that they require not only long shafts for sufficient angular displacement but also major shaft alterations to incorporate the necessary apparatus. Certain torquemeters require additions to the torque shaft which cannot withstand high speed rotational forces while other devices impose a torque load on the shaft which gives an incorrect reading. Likewise some torquemeters transmit electrical energy from a rotating member to a stationary indicating device through electrical contacts which do not function properly at high speeds.

The deficiencies of the torque measuring devices of the prior art have been overcome by the angular-twist torquemeter of the present invention which utilizes a pair of axially spaced planar surfaces on a torque shaft with an optical electromechanical measuring system adjacent the shaft. This measuring system has no physical contact with the rotating shaft and directs a collimated beam of light from one surface to the other. A readout servosystem responsive to movement of the reflected collimated beam as one of the planar surfaces is angularly displaced relative to the other by the application of torque is used to relate this reflected beam movement to the applied torque.

It is, therefore, an object of the present invention to provide an angular-twist torquemeter with an optical electro-mechanical measuring system that has no physical contact with the torque shaft.

A further object of the invention is to provide a torquemeter that may be statically calibrated and is remote reading to facilitate the measurement of high torque at high rotative speeds.

A further object of the invention is to provide an extremely accurate optical torquemeter having a relatively short shaft with the ability to accommodate axial and radial movements of this shaft.

Other objects and advantages of the invention will be apparent from the specification which follows and from the drawings wherein like numerals are used throughout to identify like parts.

In the drawings:

FIG. 3 is a schematic view, in elevation, of the optical system of the torquemeter showing its optical path in an unfolded position to illustrate the rotary motion compensation feature; and FIG. 4 is a schematic view illustrating another motion compensation feature of a torquemeter constructed in accordance with the present invention.

Figure 1:
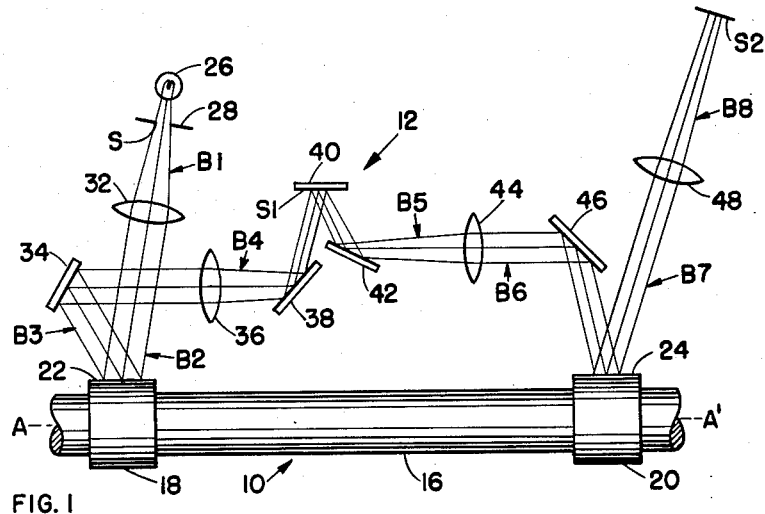
FIG. 1 is a plan view of a torque shaft for an angular-twist torquemeter constructed in accordance with the invention having its optical system shown schematically.
Figure 2:
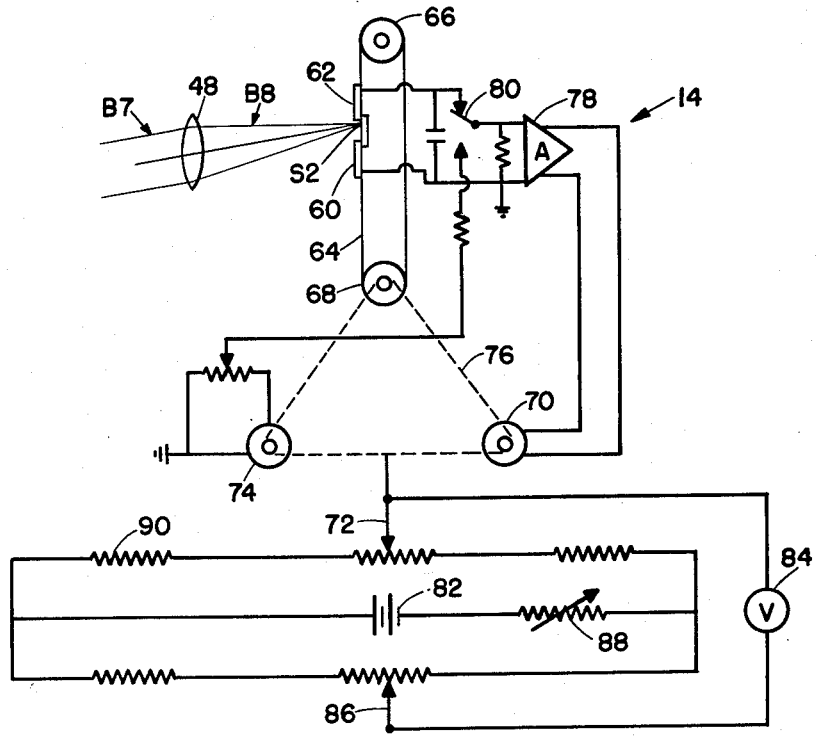
FIG. 2 is a schematic view of a readout servosystem for a torquemeter constructed in accordance with the invention.

The torquemeter of the present invention comprises a shaft 10 and an optical system 12 shown in FIG. 1 together with a readout servosystem 14 shown in FIG. 2. The shaft 10 may be either hollow or solid and comprises a centrally disposed torsional spring section 16 interposed between a pair of spaced rigid sections 18 and 20 having flat, polished, light-reflecting surfaces 22 and 24 respectively which rotate as an integral part thereof. These rotating reflectors 22 and 24 are co-planar and parallel to the axis of rotation A–A' of the shaft 10. The surface of each reflector is ground and lapped to at least a four-microinch finish whereupon it is polished to provide an efficient light-reflecting surface. The rotating reflectors 22 and 24 are optically flat to at least four helium light bands to insure image sharpness.

A typical shaft 10 having a length of seven and one-half inches between the reflectors 22 and 24 gave a 2° to 3° deflection in the spring section 16 at full load. This full load torsional stress was approximately equal to one-half the elastic limit of the shaft material, and the diameter of the spring section 16 is determined by this elastic limit as well as the shaft support, couplings used, and critical rotational speeds. The design of the rigid sections 18 and 20 is dependent upon the type of couplings used, and these sections are preferably symmetrical to facilitate dynamic balancing.

The optical system 12 shown in FIG. 1 includes a light source in the form of a lamp 26 having a mask 28 with a narrow slit S therein. The long dimension of the slit S is in the plane of FIG. 1, and a light beam B1 formed by this slit is directed towards the rigid section 18 while a collimating lens 32 positioned between the lamp 26 and the shaft 10 forms a first collimated beam B2 as light rays from the lamp 26 pass therethrough. A portion of the collimated beam B2 is intermittently reflected as the reflector 22 rotates thereby forming a first reflected beam B3 that sweeps along an arcuate path. This intermittent reflected beam B3 is directed by a fixed reflector 34 to a first converging lens 36 which forms a converging intermittent beam B4 that is reflected from a fixed reflector 38 to another fixed reflector 40 where a first image S1 of the slit S is formed. This image S1 intermittently sweeps along the reflector 40 in a plane substantially parallel to the axis A–A' and normal to the plane of FIG. 1. Rays from this moving image S1 diverge toward a fixed reflector 42 to form an intermittent diverging beam B5 that is directed through a recollimating lens 44 which recollimates the light rays into a second collimated beam B6 that is likewise intermittent and sweeps in phase with the beam B2. A fixed reflector 46 directs the beam B6 toward the rigid section 20 of the shaft 10. All of the fixed reflectors in the optical system 12 are first surface mirrors.

The light rays in the intermittent collimated beam B6 are reflected from the second rotating reflector 24 on the rigid section 20 thereby forming a second intermittent reflected beam B7 which passes through a second converging lens 48. All of the lenses in the optical system 12 are preferably achromatic, however it is contemplated that other lens types may be used.

An intermittent converging beam B8 formed by the lens 48 is stationary as will be described later and produces an image S2 of the light source slit S. This final image S2 does not rotate or sweep because of the rotation of the shaft 10; however, it is intermittent because of the limited time the light is incident on the rotating reflectors 22 and 24.

When torque is applied to the shaft 10, the reflector 24 may be considered as being rotated at an angle relative to the reflector 22, and the final image S2 of the slit S is displaced. The displacement is proportional to the rotation of the reflector 24 with respect to the reflector 22, and this twist is proportioned to the torque being transmitted by the rotating shaft 10.

The readout servosystem 14 shown in FIG. 2 comprises a pair of selenium photovoltaic cells 60 and 62 that can integrate the light pulses from the image lens 48. The cells 60 and 62 are spaced a predetermined distance on a belt 64, or the like, that is mounted for movement on pulleys 66 and 68. The spaced cells 60 and 62 are mechanically coupled to a two-phase balancing motor 70, a precision output potentiometer 72 and a damping generator 74 by the belt 64, the pulley 68 and a chain 76, or the like.

Electrically the cells 60 and 62 are in series opposition and are connected to a servoamplifier 78 that drives the balancing motor 70 which positions in the cells 60 and 62 so that the gap or space between them follows the final image S2. Direct current pulses from the cells 60 and 62 pass to a chopper 80 at the input of the servoamplifier 78 which, in turn, controls the operation of the balancing motor 70. The function of the damping generator 74 is to decrease oscillations of the driving motor 70.

As the resistance of the potentiometer 72 is altered by movement of the chain 76 a portion of voltage from a suitable D.C. voltage source 82 is transmitted to a remote indicating or recording device 84. The zero setting and span adjustment of the device 84 is controlled by a pair of variable resistances 86 and 88 respectively, and temperature compensation is accomplished by a temperature sensitive resistor 90. The portion of the supply voltage transmitted to the recording device 84 as determined by the potentiometer 72 is directly porportional to the angle of twist in the shaft 10 and the torque transmitted.

An important feature of the invention is that the optical system 12 is motion compensating. Motion is compensated when the direction of the collimated beam B7 leaving the rotating reflector 24 is unchanged for shaft rotation and translation in three orthogonal axes. Although the collimated beam may be displaced by such motion of the shaft 10, the final image S2 is stationary because it is at the focus of the collimated beam. The image is displaced only by angular deflection of the collimated beam.

Shaft rotation about its longitudinal axis A–A' is shown in FIG. 3. This is an elevation view of FIG. 1 with the optical path unfolded between the reflectors 22 and 24. Therefore the rotation at one end of the shaft 10 appears to be in the opposite direction to that at the other end. The intermediate image S1 formed by lens 36 sweeps vertically with shaft rotation, and by the symmetry of the lenses 36 and 44 the beam B7 leaving the reflector 24 is stationary as the shaft 10 rotates.

Referring again to FIG. 3, the reflectors 22 and 24 at the periphery of the shaft 10 move upward as they rotate. For maximum flux transmission, the lenses 36 and 44 are each spaced from the shaft axis A–A' a distance equal to the focal length of the lens plus one-half of the radius of the shaft 10. As the shaft 10 rotates the rigid section 18 moves so that its reflecting surface is positioned at 22a. Collimated light in the beam B2 from the lens 32 (not shown) is reflected as shown by the dotted lines in FIG. 3 through the lens 36 to an intermediate image shown at S1a. This light beam then travels through the lens 44 where it is recollimated and directed toward the other reflecting surface positioned at 24a for reflection to the final image S2 (not shown) along the beam B7. Further rotation of the shaft 10 moves the rigid section 18 so that its reflector is positioned at 22b, and the collimated light in the beam B2 is reflected as shown by the solid lines. During this rotation the intermediate image moves in a plane parallel to the axis A–A' to the location indicated at S1b while the rigid section 20 positions its reflector at 24b. The beam leaving the reflector 22 thus follows the displacement of the reflector 24, and it is cut off symmetrically by its interception at the rims of the lenses 36 and 44.

The lenses 36 and 44 have flat fields at the intermediate image S1 which maintains collimation of the beam B6 at the reflector 24 and a sharp focus at the final image S2. The achromatic lenses, when oriented for minimal spherical aberration and coma at a plane spaced from the shaft axis A–A' a distance equal to one-half the radius of the shaft, yield the desired flat field very closely.

Shaft rotation about an axis normal to both the axis A–A' and the plane of FIG. 1 is shown in FIG. 4 which corresponds to FIG. 1 without lenses and with two fixed reflectors. Rotation of the shaft 10 through an angle K is compensated by an even number of reflections so that the beam B7 leaving the reflector 24 is not deviated. In the actual system shown in FIG. 1 five reflections by mirrors 34, 38, 40, 42 and 46 plus the intermediate image S1 formed by the lenses 36 and 44 are equivalent to an even number of two reflections.

Referring again to FIG. 4 collimated light in the beam B2 strikes the rigid section 18 of the shaft 10 at an acute angle of incidence L with the reflecting surface 22 to avoid interference of the optical elements. This light is reflected along a path shown by the solid lines as previously described before the shaft 10 rotates through the angle K. After the shaft has rotated through this angle the reflected light from the beam B2 is deviated by an amount equal to 2K. The light reflected from the surface 22 after the shaft 10 has revolved to the position indicated by the dotted lines in FIG. 4 moves along a path which is also illustrated by dotted lines, and all the light reflected from the surface 24 remains parallel to the path of the light before the shaft was revolved.

Rotation of the shaft 10 about an axis in the plane of FIG. 1 and perpendicular to the shaft axis A–A' displaces the reflectors 22 and 24 in their own plane. Consequently no compensation is needed. Shaft translation in any direction does not change the direction of the beam B7 leaving the reflector 24 because it is collimated at both reflectors 22 and 24, and these reflectors are flat surfaces.

While the preferred embodiment of the torquemeter has been shown and described, it will be appreciated that various structured modifications of the invention may be made without departing from the spirit of the invention and the scope of the subjoined claims. For example, it is contemplated that the averaging of torque oscillation can be extended by placing a number of reflectors around the shaft instead of at 22 and 24 only.

What is claimed is:
1. Apparatus for measuring torques applied to a shaft rotating at high speeds, said apparatus comprising
a pair of axially spaced reflectors on said shaft,
a light source for forming a light beam that is directed toward one of said reflectors thereby producing a moving intermittent reflected beam that sweeps along an arcuate path as said shaft rotates, a converging lens in said path for forming a moving image of said light source that intermittently sweeps in a plane substantially parallel with the axis of rotation of said shaft, lens means for reforming light from said moving image into a light beam that moves in phase with said moving reflected beam, means for directing said moving light beam toward the other of said reflectors thereby producing a stationary intermittent reflected beam that is deflected by the application of torques to said rotating shaft, and another converging lens in the path of said stationary intermittent reflected beam for forming a stationary intermittent image of said light source that is deflected a distance proportional to the torques applied to said shaft.

2. Apparatus for measuring torques applied to a shaft rotating at high speeds as claimed in claim 1, including means for collimating said beam of light that is directed toward said first reflector, and said lens means comprising a recollimating lens.

3. Apparatus for measuring torques applied to a rotating shaft that is subjected to displacement about an axis angularly disposed to its axis of rotation, said apparatus comprising a pair of axially spaced light reflecting surfaces on said shaft, a light source for producing a light beam that is directed toward one of said surfaces thereby reflecting a moving intermittent beam that sweeps along an arcuate path as said shaft rotates, an odd number of stationary reflectors for directing said moving intermittent beam from said arcuate path toward the other of said surfaces, a first lens in the path of said moving intermittent beam reflected from one of said stationary reflectors for forming a moving image of said light source that intermittently sweeps in a plane substantially parallel with the axis of rotation of said shaft, a second lens for reforming light from said moving image into a light beam that moves in phase with said moving intermittent beam, said stationary reflectors and said lenses forming an optical system which produces a stationary intermittent beam reflected from said other surface that is deflected by the application of torques to said rotating shaft, and a third lens in the path of said stationary intermittent beam for forming a stationary intermittent image of said light source, said stationary intermittent image being deflected by a torque applied to said shaft, the amount of said deflection being proportioned to the magnitude of said torque.

4. Apparatus for measuring torques applied to a rotating shaft that is subject to both radial and axial displacement as well as angular displacement about an axis angularly disposed to the axis of rotation of said shaft, said apparatus comprising a pair of axially spaced light reflecting surfaces on said shaft, a light source for producing a light beam that is directed toward one of said surfaces thereby reflecting a moving intermittent beam that sweeps along an arcuate path as said shaft rotates, means in the path of said light beam from said source for collimating said light, a first stationary reflector in said arcuate path for altering the path of said moving intermittent beam, a converging lens for intercepting light from said first stationary reflector for forming a moving image of said light source that intermittently sweeps in a plane substantially parallel with the axis of rotation of said shaft, a second stationary reflector between said converging lens and said moving image for altering the path of light from said converging lens, a third stationary reflector positioned substantially at the plane of said moving image, a recollimating lens for reforming light from said third stationary reflector into a collimated light beam that moves in phase with said moving intermittent beam, a fourth stationary reflector between said third stationary reflector and said recollimating lens for directing light from said moving image to said recollimating lens, a fifth stationary reflector for directing said moving collimated light beam toward the other of said light reflecting surfaces on said shaft thereby reflecting a stationary intermittent beam that is deflected by the application of torques on said rotating shaft, and another converging lens in the path of said stationary intermittent beams for forming a stationary intermittent image of said light source that is deflected a distance proportional to the torque applied to said shaft.

5. A high speed optical torquemeter comprising a rotatable shaft having a pair of spaced light reflecting surfaces thereon, an optical system adjacent said shaft comprising means for directing a collimated beam of light toward said shaft, a first motion compensating lens in the optical path of the beam reflected by one of said light reflecting surfaces for converging the light to an intermediate image, a second motion compensating lens in the optical path of the beam from said intermediate image for recollimating and directing the light toward the other light reflecting surface, an image lens in the optical path of the beam reflected by the other light reflecting surface for converging the light to a fixed image, and a readout servosystem responsive to movement of said final image as said other light reflecting surface is angularly displaced relative to said one light reflecting surface by the application of torque to said shaft, said servosystem comprising a pair of spaced photovoltaic cells for integrating the light pulses of said beam at said final image, means for mechanically coupling said cells to a balancing motor and an output potentiometer, means for electrically connecting said cells to a servoamplifier, and means for electrically connecting said servoamplifier to said balancing motor for positioning said cells so that the gap between said cells follows said final image.

6. A high speed optical torquemeter comprising a rotatable shaft having a centrally disposed spring section interposed between a pair of spaced rigid sections, each of said rigid sections having a planar light reflecting surface, said surfaces being coplanar and parallel to the axis of rotation of said shaft, an optical system adjacent said shaft comprising, a light source for directing light toward said shaft, a collimating lens positioned between said light source and one of said rigid sections for forming a collimating beam as said light passes therethrough to the planar surface on said one rigid section, a first motion compensating lens in the optical path of said collimated beam reflected by said planar surface for converging said beam to an intermediate image, a second motion compensating lens in the optical path of said beam from said intermediate image for recollimating said beam and directing it toward the planar surface on the other rigid section, an image lens in the optical path of said beam reflected by the planar surface on said other rigid section for converging said beam to a fixed image, and a readout servosystem responsive to movement of said final image as said other rigid section is angularly displaced relative to said one rigid section by the application of torque to said shaft, said servosystem comprising a pair of spaced selenium photovoltic cells connected in series opposition for integrating the light pulses of said beam at said final image, means for mechanically coupling said cells to a balancing motor and an output potentiometer, means for electrically connecting said cells to a servoamplifier, and means for electrically connecting said servoamplifier to said balancing motor for positioning said cells so that the gap between said spaced cells follows said final image.

References Cited by the Examiner

UNITED STATES PATENTS

| | | |
|---|---|---|
| 1,822,075 | 9/31 | Aronoff. |
| 2,376,311 | 5/45 | Hood. |
| 2,402,719 | 6/46 | Allison _____ 73—136 |
| 2,476,025 | 7/49 | Clark. |
| 2,629,256 | 2/53 | Rank _____ 73—136 |

FOREIGN PATENTS 242,913   1/12   Germany.

RICHARD C. QUEISSER, *Primary Examiner.*

UNITED STATES PATENT OFFICE
CERTIFICATE OF CORRECTION

Patent No. 3,196,675                                    July 27, 1965

Donald R. Buchele et al.

It is hereby certified that error appears in the above numbered patent requiring correction and that the said Letters Patent should read as corrected below.

Column 1, line 23, for "different" read -- deficient --; line 25, for "requred" read -- required --; column 3, line 55, for "porportional" read -- proportional --; column 7, line 12, for "photovoltic" read -- photovoltaic --.

Signed and sealed this 15th day of February 1966.

(SEAL)
Attest:

ERNEST W. SWIDER                                      EDWARD J. BRENNER
Attesting Officer                                         Commissioner of Patents